3,033,879
HALOGENO-DINAPHTHO-FURAN-DIONES
Mario Francesco Sartori, Wilmington, Del., assignor to
E. I. du Pont de Nemours and Company, Wilmington,
Del., a corporation of Delaware
No Drawing. Original application Feb. 17, 1958, Ser.
No. 715,489. Divided and this application Apr. 25,
1960, Ser. No. 24,198
1 Claim. (Cl. 260—346.2)

This application is a division of my application Serial No. 715,489, filed February 17, 1958, which in turn is a continuation-in-part of my application Serial No. 612,923, filed October 1, 1956, both now abandoned.

My present invention deals with novel organic compounds which are useful as dyes and intermediates. More particularly, this invention deals with novel organic compounds of the formula

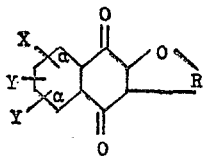

wherein R is the ortho-divalent radical of a naphthalene compound which is free of water-solubilizing groups, X is an amino radical situated in one of the α-positions, while the Y's are halogen atoms such as chlorine or bromine.

I have found that the compounds of the above formula are red crystalline materials. They are useful as dyes for polyester fiber and yield upon the same bright, strong dyeings of good light-fastness and good sublimation-fastness.

The above compounds may be synthesized by reacting a 1- or 2-naphthol compound, which possesses an exchangeable H-atom in position ortho to the OH group, with a halogenonaphthoquinone of the general formula

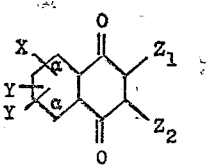

wherein X is an amino group situated in one of the α-positions, the Y's are halogen atoms (Cl or Br), while $Z_1$ and $Z_2$ represent halogen atoms such as chlorine or bromine, and may be alike or different. Reaction may be effected by heating the said reactants in the presence of an acid binding agent, such as sodium acetate or a tertiary nitrogenous base, for instance pyridine, and in a liquid medium which is inert toward the reactants. Where a liquid nitrogenous base is selected as acid absorbing agent, an excess thereof may be employed to serve simultaneously as diluent.

As illustrations of naphthol compounds which may be employed for this invention, may be mentioned 1-naphthol, 2-naphthol, 6-bromo(or chloro)-2-naphthol, 6-bromo(or chloro) - 1 - naphthol, 2,3 - hydroxy-naphthoic ethyl ester, 2,3-hydroxynaphthoic acid amide, and 2,3-hydroxynaphthoic acid anilide.

In the reaction, the OH group of the naphthol compound reacts with one of the Z's in the naphthoquinone compound to split off hydrogen halide, while the second Z likewise splits off as HZ by reaction with the H atom ortho to the OH group.

Generally speaking, the natures and positions of the groups X and Y in the naphthoquinone compound will have a directive influence on the reaction, and will determine which of the Z's will react with the OH group. But as is often the case in organic chemistry, the directive influence is not absolute, and statistically a considerable proportion of the isomeric compound is formed, resulting from reaction of the other Z with the OH group. Consequently, the condensation products are generally mixtures of two isomers. For instance, when a chloro-tribromo-amino naphthoquinone (obtained as in Example 1 below) is reacted according to this invention with 1-naphthol, the product consists of a mixture of the following two isomers:

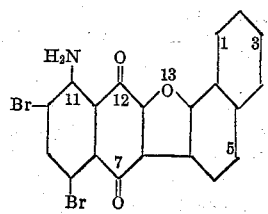

and

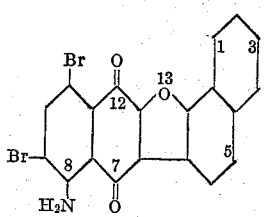

These may be named, respectively, 11-amino-8,10-dibromo-dinaphtho[1,2-2',3']furan-7,12-dione, and 8-amino-9,11-dibromo-dinaphthol[1,2-2',3']furan-7,12-dione.

If 2-naphthol is selected for the same synthesis, the resulting product comprises a mixture of

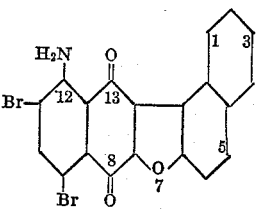

and

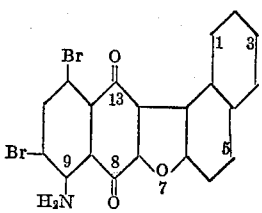

which may be named, respectively, 12-amino-9,11-dibromo-dinaphtho[2,1-2',3']furan-8,13-dione, and 9-amino-10,12-dibromo-dinaphthol[2,1-2',3']furan-8,13-dione.

Without limiting this invention, the following examples are given to illustrate my preferred mode of operation. Parts mentioned are by weight.

*Example 1*

Using the procedure described in U.S. Patent 2,687,940, 5-amino-2,3-dichloro-1,4-naphthoquinone is subjected to relatively intense bromination, and a chloro-tribromoamino naphthoquinone is obtained which may be represented by the formula

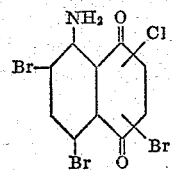

A solution of 16 parts of 1-naphthol in 300 parts of pyridine is agitated at room temperature and 44 parts of the above amino-tribromo-chloro naphthoquinone are added. A dark brown suspension is formed and the temperature is raised to 110° C. over a 1 hour period. The reaction mass is agitated at this temperature for 4 hours, after which it is allowed to cool while stirring for 12 hours. The precipitate is filtered off, washed with alcohol and dried. After crystallizing from o-dichlorobenzene the product is obtained as a dark red powder; M.P. 302°–304° C. The absorption maximum of this material in o-dichlorobenzene is located at 500 millimicrons. A shoulder on the absorption curve at 440 millimicrons and the analytical data show that the product consists of the isomeric compounds 8-amino-9,11-dibromo-dinaphtho[1,2-2',3']furan-7,12-dione and 11-amino-8,10-dibromo-dinaphtho[1,2-2',3']furan-7,12-dione.

A fabric of "Dacron" polyester fiber dyed with the new product has a red shade of good light- and sublimation-fastness.

*Example 2*

A similar dye is obtained by using 2-naphthol in Example 1 instead of 1-naphthol. This dye consists of the isomeric compounds 9-amino-10,12-dibromo-dinaphtho[2,1-2',3']furan-8,13-dione and 12-amino-9,11-dibromo-dinaphtho[2,1-2',3']furan-8,13-dione.

*Example 3*

Instead of using the chloro-tribromo-amino-naphthoquinone of Example 1, tetrachloroamino-naphthoquinone may be used in similar manner to give a red dye for "Dacron" polyester fiber.

It will be understood that the details of the above examples may be varied widely within the skill of those engaged in this art.

I claim as my invention:
A compound of the formula

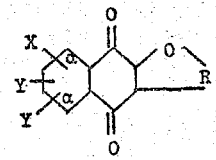

wherein X is the radical $NH_2$ situated in one of the α-positions, the two Y's represent halogen atoms of the group consisting of chlorine and bromine, while R is an ortho-bivalent naphthalene radical selected from the group consisting of

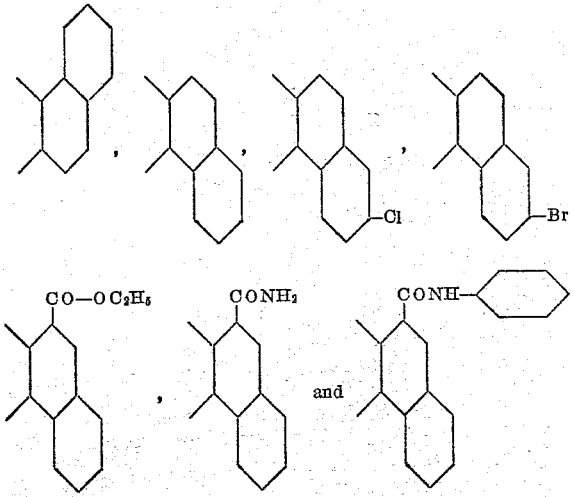

References Cited in the file of this patent
UNITED STATES PATENTS
2,967,870    Randall et al. _____ Jan. 10, 1961